United States Patent
Rebboah

(10) Patent No.: US 11,560,872 B2
(45) Date of Patent: Jan. 24, 2023

(54) HYDROKINETIC TELESCOPIC TURBINE DEVICE

(71) Applicant: Blue Shark Energy LLC, Charleston, SC (US)

(72) Inventor: Philippe Paul Rebboah, Peoria, AZ (US)

(73) Assignee: BLUE SHARK ENERGY LLC, Charleston, SC (US)

( * ) Notice: Subject to any disclaimer, the term of this patent is extended or adjusted under 35 U.S.C. 154(b) by 0 days.

(21) Appl. No.: 17/843,688

(22) Filed: Jun. 17, 2022

(65) Prior Publication Data
US 2022/0403815 A1 Dec. 22, 2022

Related U.S. Application Data

(60) Provisional application No. 63/212,516, filed on Jun. 18, 2021.

(51) Int. Cl.
*F03B 13/26* (2006.01)
*F03B 13/22* (2006.01)

(52) U.S. Cl.
CPC ............ *F03B 13/264* (2013.01); *F03B 13/22* (2013.01); *F05B 2220/32* (2013.01); *F05B 2260/50* (2013.01)

(58) Field of Classification Search
CPC ..... F03B 13/264; F03B 13/22; F05B 2220/32
See application file for complete search history.

(56) References Cited

U.S. PATENT DOCUMENTS

| | | | |
|---|---|---|---|
| 7,944,073 B2 | 5/2011 | Susman | |
| 8,777,555 B1 | 7/2014 | Balbir | |
| 8,794,875 B2 | 8/2014 | Fraenkel | |
| 9,506,451 B2 | 11/2016 | Dehlsen | |
| 10,890,162 B2 | 1/2021 | Shi | |
| 2006/0244267 A1 | 11/2006 | Fraenkel | |
| 2009/0121487 A1 | 5/2009 | Fraenkel | |
| 2011/0008164 A1* | 1/2011 | Presz, Jr. .................. | F03D 1/04 415/211.2 |
| 2011/0254271 A1 | 10/2011 | Freeman | |
| 2012/0282037 A1 | 11/2012 | Luppi | |

(Continued)

FOREIGN PATENT DOCUMENTS

| | | |
|---|---|---|
| CN | 101915199 B | 2/2012 |
| CN | 103133218 B | 6/2015 |
| WO | 2020156630 A1 | 8/2020 |

*Primary Examiner* — Sean Gugger

(57) ABSTRACT

The telescopic hydrokinetic turbine system is a device meant for lifting the burden of manufacturing, installing, and maintaining hydrokinetic systems in the water. The device attempts to overcome the issues faced by present day hydrokinetic systems. To accomplish this, the device includes a light weight and easy to carry and install design, a telescopic pillar to align itself with the tide direction or even to leave the body of water for maintenance. Electrical parts are not submerged but instead remain onshore in a small cabin or housing. Further, by adding the use of multiple diffusers, the water flowing into the turbine is made smoother and the overload of water is able to be evacuated and swiped by the fins. The diffusers increase the blades working capacity while homogenizing the water flow and avoiding the phenomena of vibrations and cavitation, thereby increasing efficiency.

20 Claims, 10 Drawing Sheets

(56) References Cited

U.S. PATENT DOCUMENTS

| | | | |
|---|---|---|---|
| 2013/0015659 A1 | 1/2013 | Ayre | |
| 2013/0284608 A1* | 10/2013 | Blake | F03D 7/0204 |
| | | | 290/55 |
| 2014/0301789 A1* | 10/2014 | Fraenkel | E02D 27/52 |
| | | | 405/203 |
| 2014/0328680 A1 | 11/2014 | Todman et al. | |
| 2015/0115613 A1 | 4/2015 | Hayman | |
| 2015/0218796 A1* | 8/2015 | Seidel | E02D 27/425 |
| | | | 52/651.01 |
| 2016/0138554 A1* | 5/2016 | Hawthorne | F03B 3/128 |
| | | | 29/889.1 |

* cited by examiner

HYDROKINETIC TELESCOPIC TURBINE DEVICE

FIELD OF THE INVENTION

The present invention relates generally to hydrokinetic energy devices, more specifically to water turbines. The present invention is a water turbine-type device, activated by a current of liquid fluid, such as sea or river currents, to produce electrical energy.

BACKGROUND OF THE INVENTION

The technological hurdles met by tidal turbines are largely linked to vibrations of blades and consequently of hubs. Indeed, water currents are most of the time turbulent and do not reach the same speed or the same strength on the various areas of the blades. The density of water being eight-hundred times greater than that of air can cause different parts of the blades to be under very high stress. This phenomenon is aggravated by the length of the blades on a tidal turbine. The longer the blades are, the more important it is to keep this phenomenon in mind. It has the potential to cause intense vibrations and strong cavitation on the turbine structures since the blades of the same turbine may rotate at different speeds and intensities. It is therefore necessary to control the heterogeneous forces induced by the speed of the flow and density of water to limit deterioration of the turbine and prevent the system from breaking and stopping.

Other hurdles on hydrokinetic devices include difficulties of installation and maintenance. Those devices are often quite heavy and large since most of them bear long blades. Any required maintenance is difficult and expansive since the devices lay on the seabed or riverbed and need to be brought back to the shore. Installation is also rather heavy-duty work with excavation on the seabed or riverbed and includes the use of large barges and cranes. Therefore, it is also necessary to be able to install devices easily and to have easy access to the device for eventual maintenance.

It is an objective of the present invention to overcome the aforementioned problems. To accomplish this, the present invention comprises a light weight and easy to carry and install design, wherein installation includes drilling or using a dead weight at the base of the pillar. Preferably, the present invention is capable of rising automatically to align itself with the tide direction or even to leave the body of water for maintenance. Despite this ability, the device remains invisible in the water to avoid any visual pollution. Electrical parts are not submerged but instead remain onshore in a small cabin or housing. In other words, according to a preferred embodiment of the present invention, maintenance is made simple due to the telescopic pillar being capable of bringing the device above the surface of the water and all electronic equipment being installed in a small cabin onshore. Further, the present invention provides a relevant response to the above-mentioned problems using the specific shape of its short and strong blades. Furthermore, by adding the use of multiple diffusers, the water flowing into the turbine is made smoother and the overload of water is able to be evacuated and swiped by the fins. The diffusers increase the blades working capacity by around 100% while homogenizing the water flow and avoiding the phenomena of vibrations and cavitation. The turbines, surrounded by the diffusers, multiply the amount of harvested water. Accordingly, there are no vibrations and resolution of the blades pitch, which avoids the damaging phenomenon as mentioned earlier. Thus, the design dramatically increases the amount of work of the turbine and therefore increases the efficiency.

SUMMARY

The present invention is a system of hydrokinetic turbines meant for lifting the burden of manufacturing, installing, and maintaining hydrokinetic systems in the water. In other words, the present invention attempts to overcome the issues faced by present day hydrokinetic systems using the combination of included components. Accordingly, a telescopic pillar, a plurality of diffusers, automatic piloting system, rotating and counter-rotating turbines, and a customizable design makes the present invention light weight, efficient, easy to install, and provides durability.

DETAIL DESCRIPTIONS OF THE INVENTION

All illustrations of drawings are for the purpose of describing selected versions of the present invention and are not intended to limit the scope, configuration or design.

In reference to FIG. 1 through FIG. 10, the present invention is a hydrokinetic telescopic turbine device. It is an objective of the present invention to overcome the existing problems associated with hydrokinetic turbines, with the help of a light weight and easy to carry and install design. According to a preferred embodiment, installation includes drilling or using a dead weight at the base of the pillar. Preferably, the present invention is capable of rising automatically to align itself with the tide direction or even to leave the body of water for maintenance. Despite this ability, the device remains invisible in the water to avoid any visual pollution, Electrical parts are not submerged but instead remain onshore in a small cabin or housing. In other words, according to the preferred embodiment of the present invention, maintenance is made simple due to the telescopic pillar being capable of bringing the device above the surface of the water and all electronic equipment being installed in a small cabin onshore. Further, the present uses specific shape of its short and strong blades, and modulation and "customization" of the size of the turbines with respect to the force of the currents and water depth are made available on any chosen site. Furthermore, by adding the use of multiple diffusers, the water flowing into the turbine is made smoother and the overload of water is able to be evacuated and swiped by the fins. The diffusers increase the blades working capacity by around 100% while homogenizing the water flow and avoiding the phenomena of vibrations and cavitation. The turbines, surrounded by the diffusers, multiply the amount of harvested water. Thus, the present invention may work with a high efficiency (CP=0.72), wherein CP is the coefficient of transformation of hydrokinetic energy in electricity. Additionally, since there are no vibrations and resolution for the blades pitch, this avoids the damaging phenomenon as mentioned earlier. The design dramatically increases the amount of work of the turbine and therefore increases the efficiency. This enables manufacturing cost to come out to approximately 70% lower than existing technologies.

Figure 1:
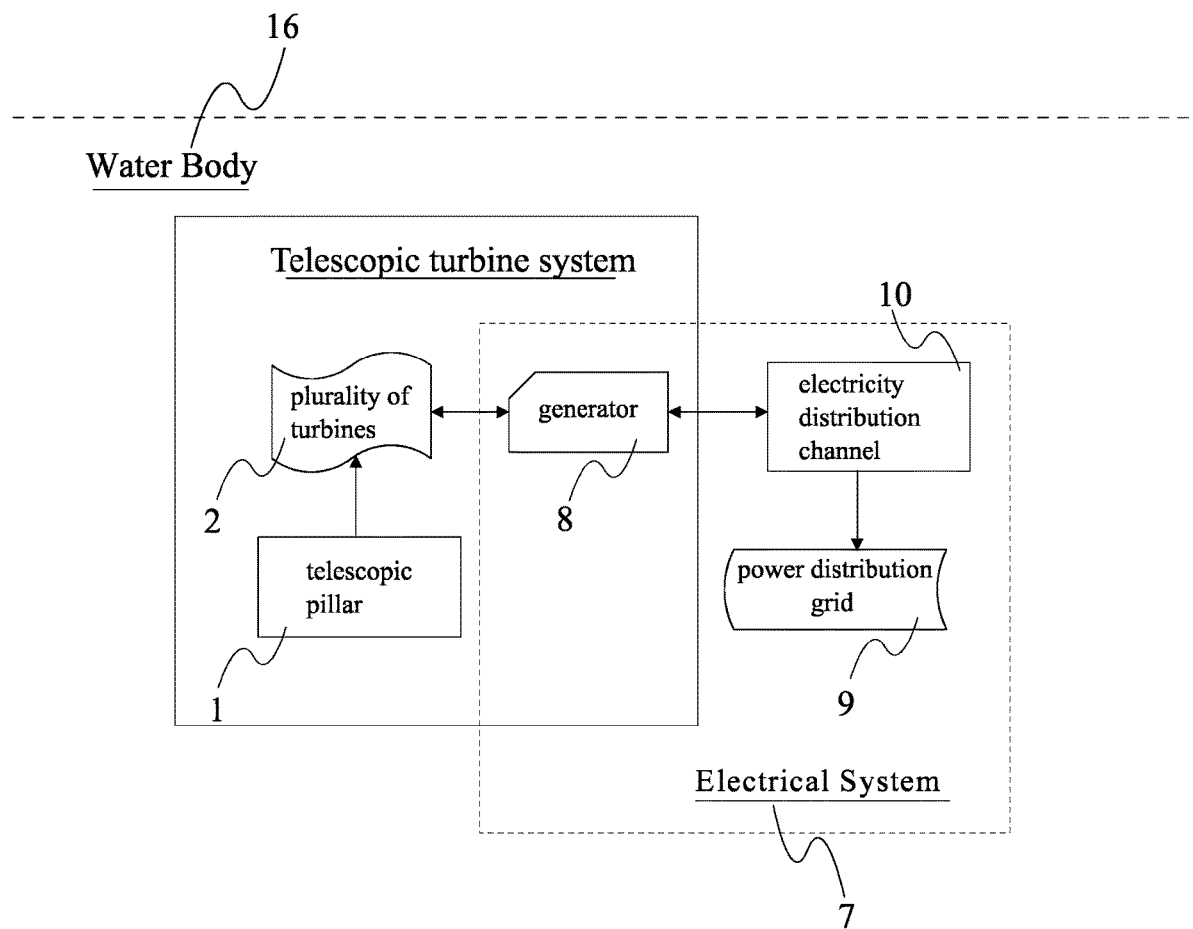
FIG. 1 is a system block diagram, according to a preferred embodiment of the present invention.
Figure 2:
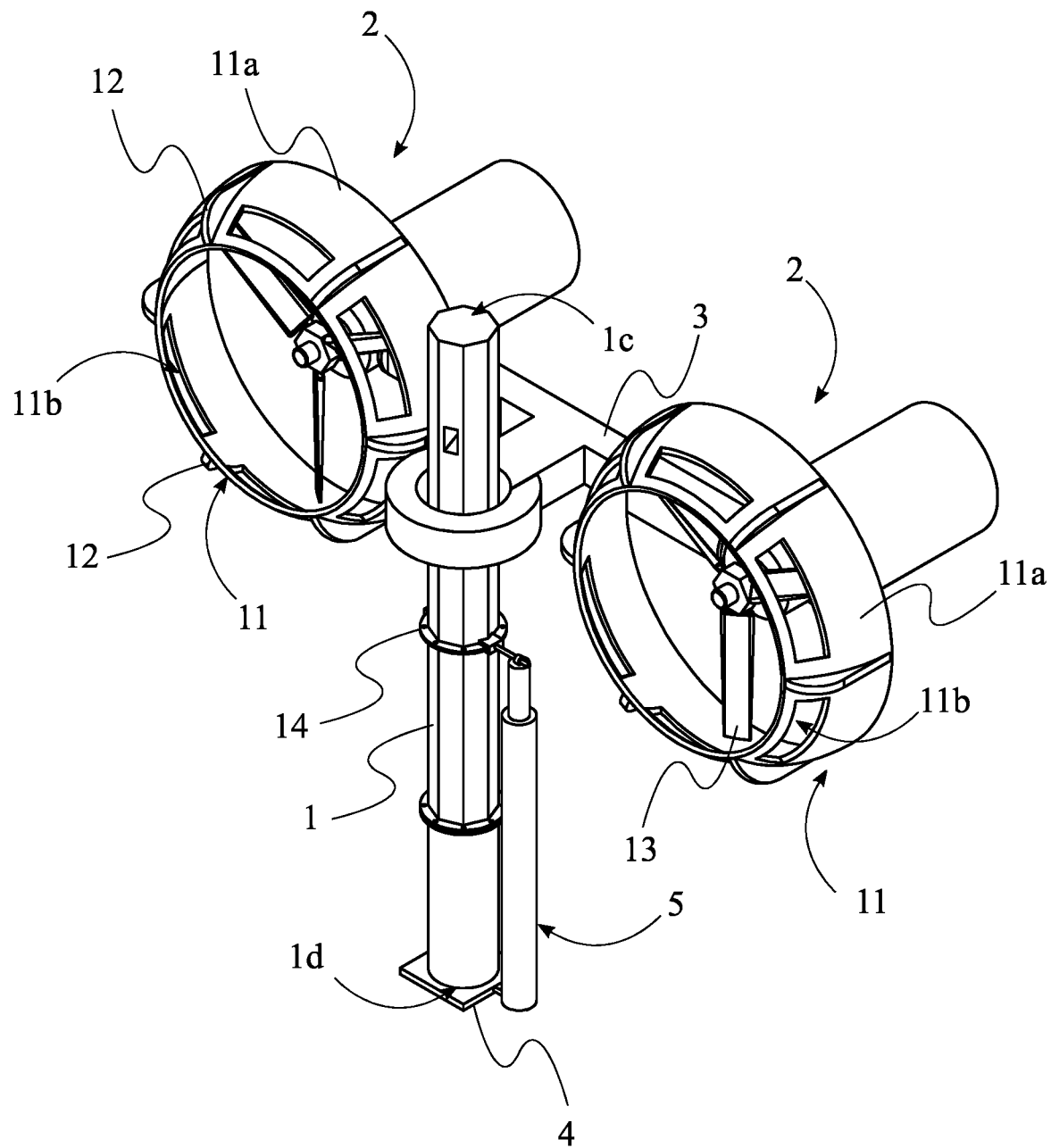
FIG. 2 is a top front left perspective view of the present invention, wherein the turbine system is raised along the telescopic pillar.
Figure 3:
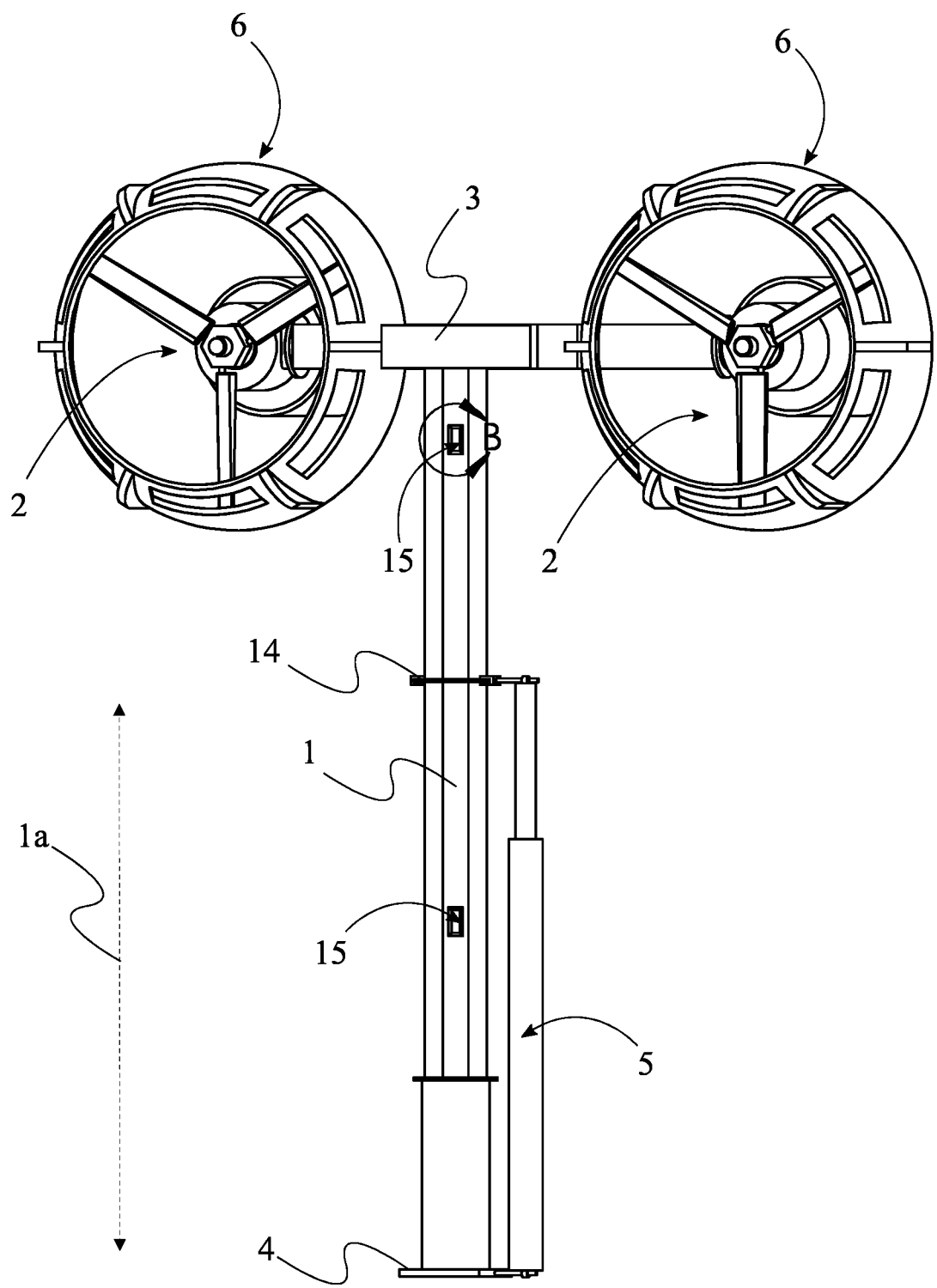
FIG. 3 is a front left perspective view of the present invention, according to the present invention.
Figure 4:
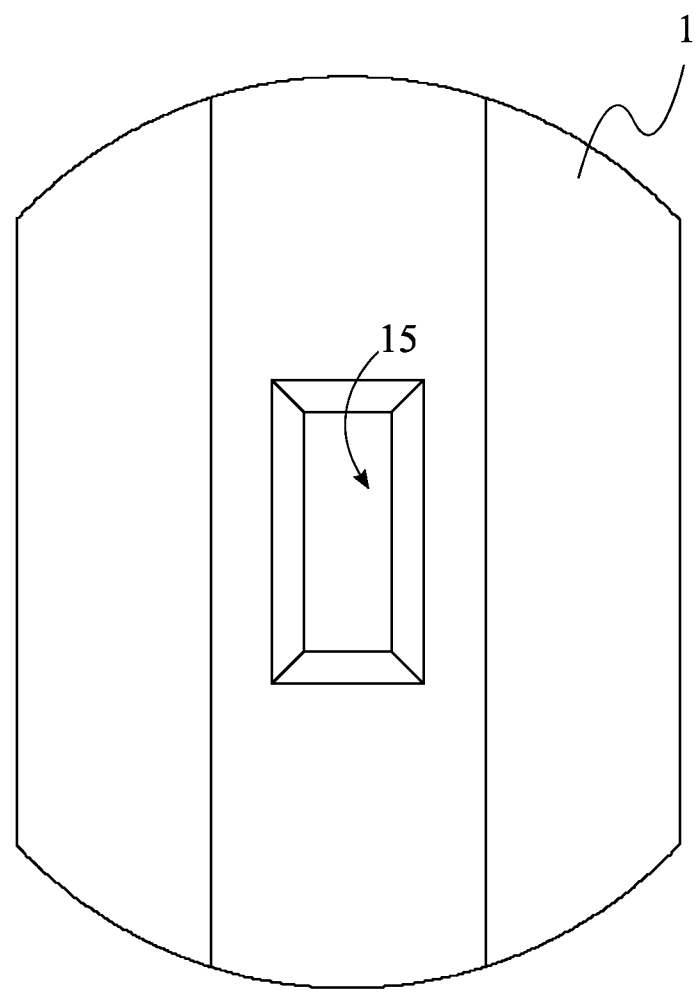
FIG. 4 is a detailed view of section 4 of FIG. 3.

The following description is in reference to FIG. 1 through FIG. 10. According to a preferred embodiment, the present invention comprises a telescopic pillar 1, a plurality of turbines 2, a turbine connecting shaft 3, and a mounting base 4. As seen in FIG. 2 and FIG. 3, the turbine connecting shaft 3 is mounted onto the telescopic pillar 1, and each of the plurality of turbines 2 is mounted onto terminal ends of the turbine connecting shaft 3. Preferably, the plurality of turbines 2, the telescopic pillar 1 and the turbine connection shaft 3 comprise a sturdy material, such as a corrosion resistant and stable metal. However, the telescopic pillar 1, the plurality of turbines 2, and the turbine connecting shaft 3 may comprise any other material, size, shape, components, arrangement of components etc. that are known to one of ordinary skill in the art, as long as the intents of the present invention are not altered.

It is an aim of the present invention to provide a hydrokinetic turbine device, activated by a current of liquid fluid, such as sea or river currents, to produce electrical energy, wherein the telescopic pillar 1 may be raised for optimum performance as well as for maintenance purpose. To that end, the turbine connecting shaft 3 is slidable along a longitudinal axis 1a of the telescopic pillar 1, as seen in FIG. 3. As seen in FIG. 2, and FIG. 5 through FIG. 8, the turbine connecting shaft is mounted on to a first position 1b on the telescopic pillar, wherein the first position 1b is laterally offset from a first end 1c of the telescopic pillar. In the preferred embodiment, the first end 1c constitutes a top end of the telescopic pillar and the first position 1b is a position beneath the first end 1c of the telescopic pillar 1. Further, a second end 1d of the telescopic pillar is mounted onto the mounting base 4, wherein the first end 1c is positioned opposite to the second end 1d across the telescopic pillar 1. As seen in FIG. 2 and FIG. 3, the mounting base 4 constitutes a bottom end of the telescopic pillar 1, that is mounted onto the bed of the water body. In other words, the mounting base 4 provides the necessary support for the entire device at the waterbed. According to a preferred embodiment, installation of the mounting base 4 includes drilling or using a dead weight at the base of the pillar, which makes installation a simple process.

To accomplish the telescopic action, the present invention comprises a lifting mechanism 5, wherein the lifting mechanism 5 is operably coupled to the telescopic pillar 1, and wherein operating the lifting system 5 enables normal extension and retraction of the first end 1c of telescopic pillar 1 with respect to the second end 1d. This is so that extension and retraction of the telescopic pillar 1 enables extension and retraction of the plurality of turbines 2 and the turbine connecting shaft 3, in and out of the water body. More specifically, the telescopic extension raises the turbines out of the water surface, thereby helping with maintenance and cleaning process for the turbines. Further, the telescopic action or the lifting mechanism 5 enables to raise and lower the plurality of turbines 2 to orient towards maximum water currents, based on the reading of sensors built within the telescopic pillar 1. Subsequently, retraction of the telescopic pillar 1 pulls the turbines 2 back into the water for the smooth operation of the hydrokinetic device, and thus preventing visual pollution. In the preferred embodiment, the lifting mechanism 5 is a hydraulic lift or an electric lift. However, the lifting mechanism 5 may comprise any other shape, size, technology etc. that are known to one of ordinary skill in the art, as long as the intents of the present invention are fulfilled.

It is an aim of the present invention to not force water on the end of the blades or prevent overload of water, thereby regulating the pitch of the blades. To that end, the present invention comprises a plurality of diffusers 6. According to the preferred embodiment, the plurality of diffusers 6 is mounted laterally around each of the plurality of turbines 2. More specifically, the plurality of diffusers 6 circumscribes the plurality of turbines 2.

In order to accomplish the smooth functioning of the hydrokinetic power generation device, the present invention comprises an electrical system 7. In the preferred embodiment, the plurality of turbines 2 is electrically connected to the electrical system 7. Preferably, the electrical system 7 comprises an electrical generator 8, an electricity distribution network 9, and a power distribution grid 10. Preferably, the plurality of turbines 2 is electrically connected to the electric generator 8, and the electric generator 8 is connected to the power distribution grid 10 through the electricity distribution network 9. In other words, the plurality of turbines 2 run by the water current drives an electric generator 8 which in turn is connected to an electricity distribution grid or power distribution grid 10 mounted in a cabin at the shore of the water body through the electricity distribution network 9. Preferably, the electricity distribution network 9 comprises submarine cables. However, the electric generator 8, the electricity distribution network 9, and the power distribution grid 10 may comprise any size, shape, components, and arrangement of components, technology, etc. that are known to one of ordinary skill in the art, as long as the intents of the present invention are not altered. To that end, the submarine cables or electricity distribution network 9 may carry electrical power as well as data associated with at least one sensor mounted within the system. Accordingly, a terminal end of the electricity distribution network 9 may go inside the telescopic pillar 1. Furthermore, the cabin in the shore may comprise electrical panels, invertors, transformers, etc. that are essential for the smooth functioning of the hydraulic power system.

A more detailed description of the present invention follows. According to the preferred embodiment, the plurality of diffusers 6 comprises a first diffuser 11, and a second diffuser 12 to form a flow mixer of annular shape centered around and surrounding each of the plurality of turbines. Accordingly, the first diffuser 11 comprises an envelope ring 11a and a plurality of gaps 11b, wherein the plurality of gaps 11b traverses the envelop ring 11a. In other words, the first diffuser 11 is equipped with open windows allowing the surplus of water to be evacuated and release the pressure at the end of the blades of each of the plurality of turbines 2. Further, the first diffuser 11 is mounted around the each of the plurality of turbines 2, and the first diffuser 11 is positioned offset from terminal ends of each of the plurality of turbines 2. More specifically, the first diffuser 11 laterally circumscribes each of the plurality of turbines 2. As seen in FIG. 2, FIG. 3, FIG. 7, and FIG. 10, the second diffuser 12 is mounted onto the envelope ring 11a. In the preferred embodiment, the second diffuser 12 comprises a plurality of fins 1, wherein the plurality of fins 12a is evenly distributed around the envelope ring 11a. In other words, the first diffuser 11a is surrounded by the second diffuser 12 in the form of radial fins fastened to the periphery of the first diffuser 11 and extending axially to the rear of the latter. The second diffuser 12 is moving the water flow and create a water circle around the first diffuser attracting the water toward the center of the turbines.

Figure 10:
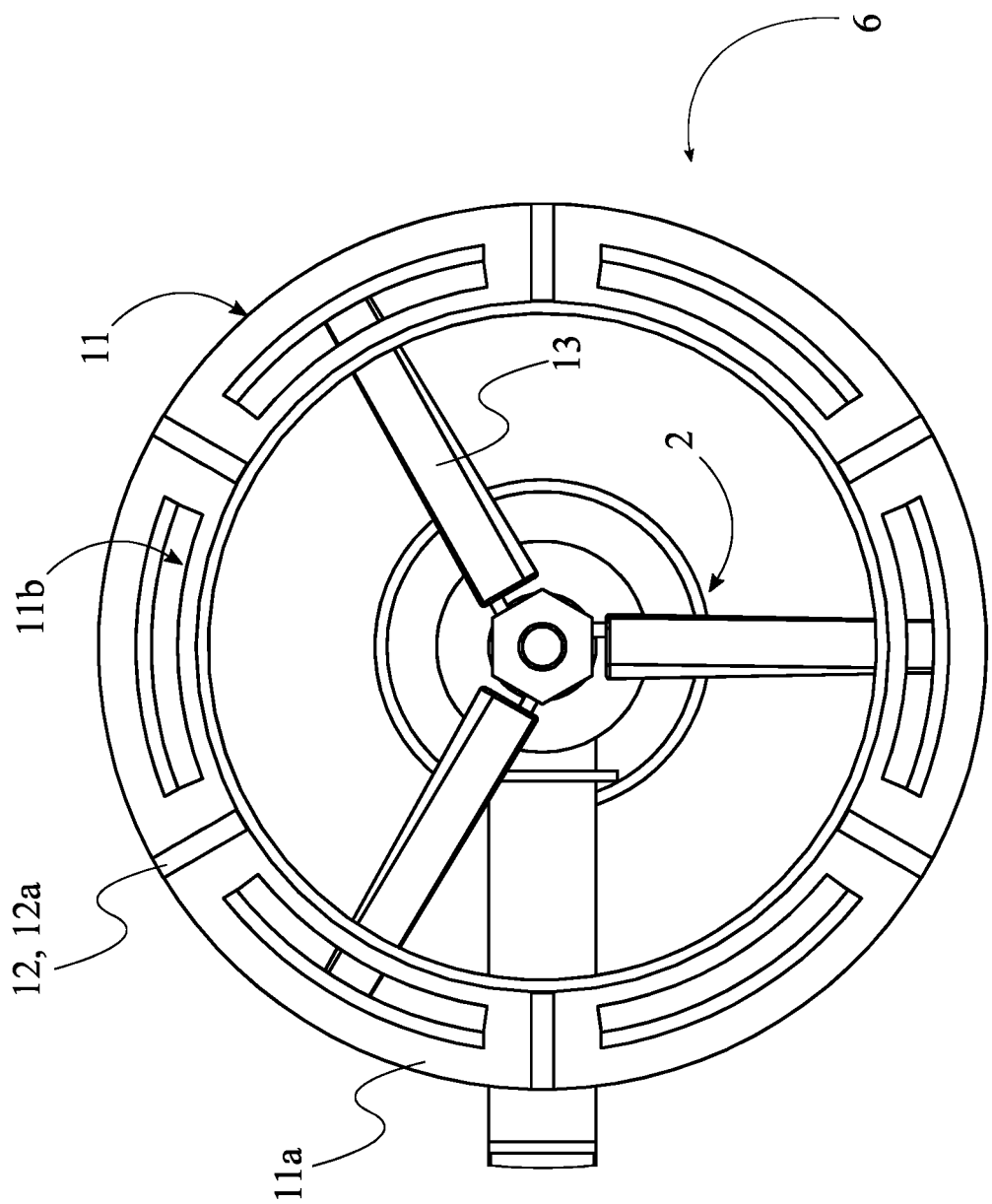
FIG. 10 is a front elevational view of a single turbine, according to the preferred embodiment of the present invention.

According to the preferred embodiment, each of the plurality of turbines 2 comprises a plurality of blades 13, wherein the plurality of blades 13 is rotatable and counter rotatable around a central transversal axis 1e. Preferably, the plurality of turbines 2 includes two rotating and counter-rotating turbines comprising at least three blades each, wherein each of the plurality of turbines 2 is, surrounded by the first diffuser 11. Further, as seen in FIG. 10, the shape of each of the plurality of blades 13 is such that, the shape allows for the counter rotative movement of the turbines. However, it should be noted that the plurality of blades 13, and the plurality of turbines 2 may comprise any other shape, size, number, orientation, component, arrangement of components etc. that are known to one of ordinary skill in the art, as long as the intents of the present invention are not altered. More specifically, the size of the diffusers 6 is customizable to adapt to the configuration of the blade 13. For example, in an island where the water currents are strong and power is needed, a small turbine may be used, such that the power generated from that turbine is sufficient to supply energy to the entire island. In other words, in a zone where water currents are strong, big turbines are not needed. Alternately, in an island where the water currents are low, the diameter of the diffuser may be made bigger, and the blades may be made short. In other words, smaller blades and bigger diffuser may generate more power even in places where the water currents are low. Thus, customizability of the present invention allows for increased efficiency.

Figure 9:
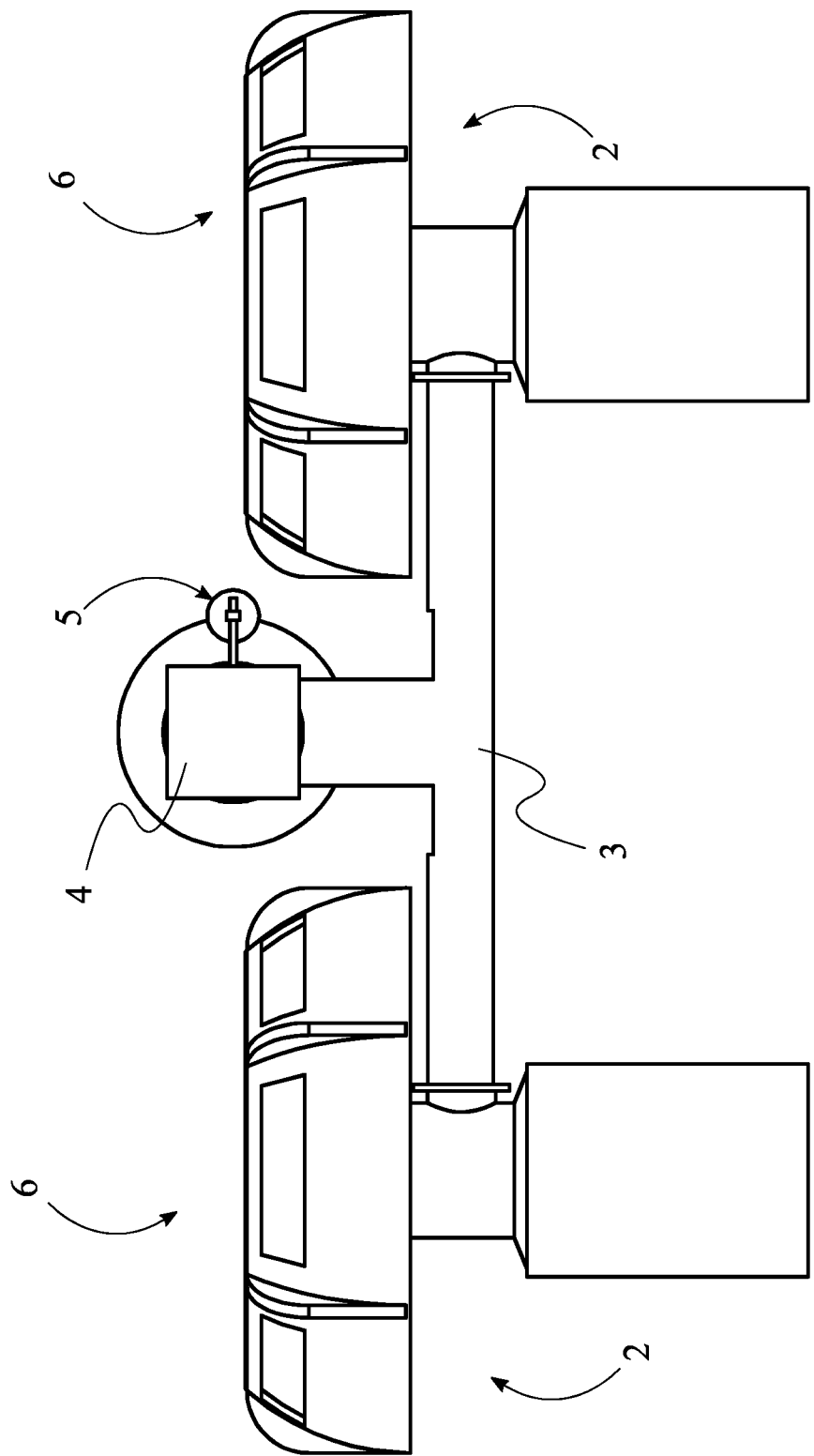
FIG. 9 is a bottom plan view of the present invention.

Continuing with the preferred embodiment, the present invention comprises an automatic piloting system 14. As seen in FIG. 2 and FIG. 9, the automatic piloting system 14 is rotatably coupled to the telescopic pillar 1, wherein the automatic piloting system 14 enables automatic positioning of the plurality of turbines 2 towards a direction of optimum tide and water current. Preferably, the automatic piloting system 14 comprises magnetic bearings that aligns the system around the telescopic pillar 1 as well as allows the system to sway. More specifically, the automatic piloting system 14 automatically positions or orients the device in the right direction of the tide or the current at an optimum direction determined from the collection of data relating to the currents. This may be collected by sensor means, such as ADCP (acoustic doppler current profiler), or measuring the pressure, the intensity of the current, the speed of the current etc. However, the automatic piloting system 14 may comprise any other size, shape, technology, etc. that are known to one of ordinary skill in the art, as long as the intents of the present invention are fulfilled.

Figure 5:
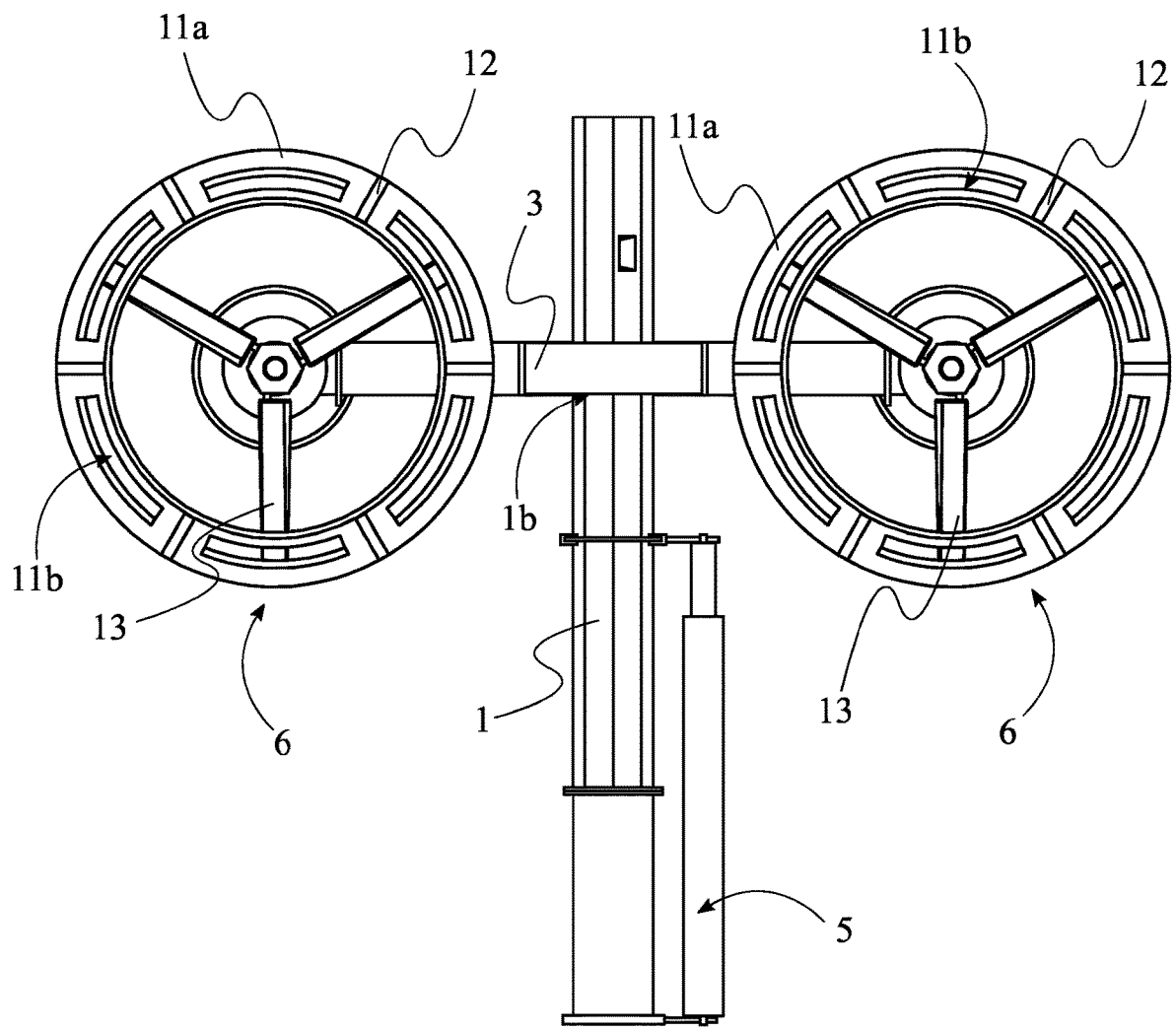
FIG. 5 is a front elevational view of the present invention.
Figure 6:
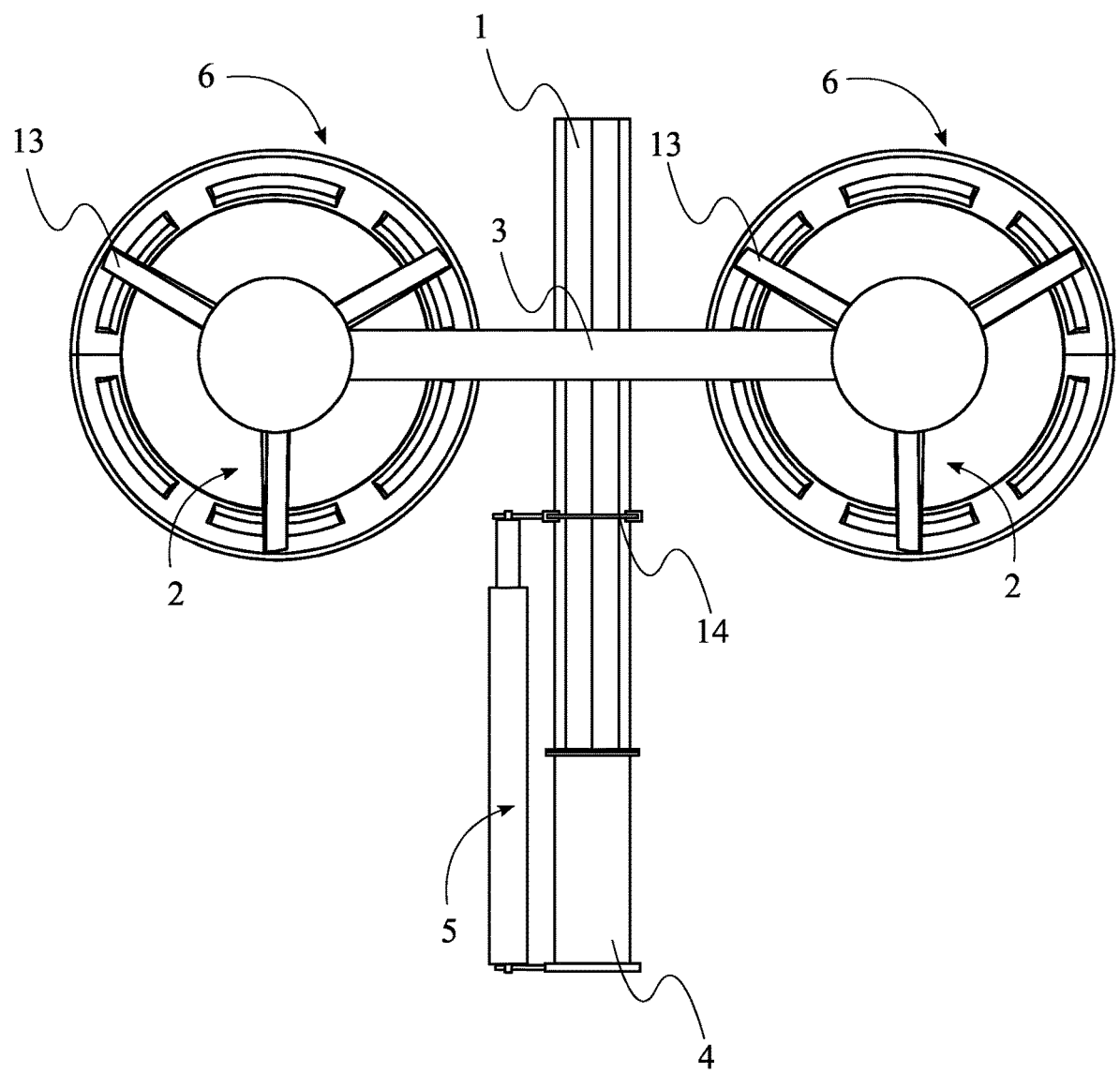
FIG. 6 is a rear elevational view of the present invention.
Figure 7:
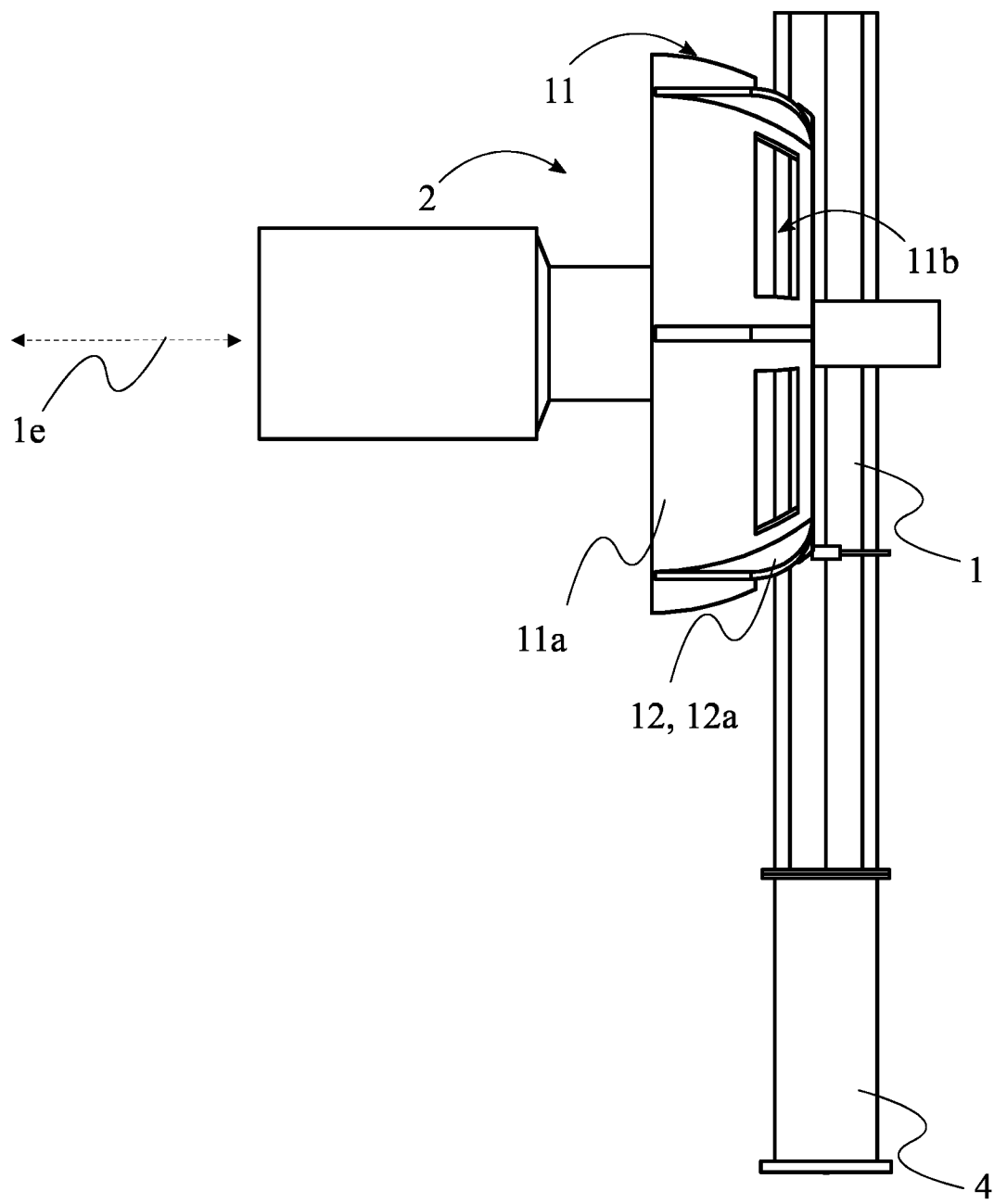
FIG. 7 is a right-side elevational view of the present invention.
Figure 8:
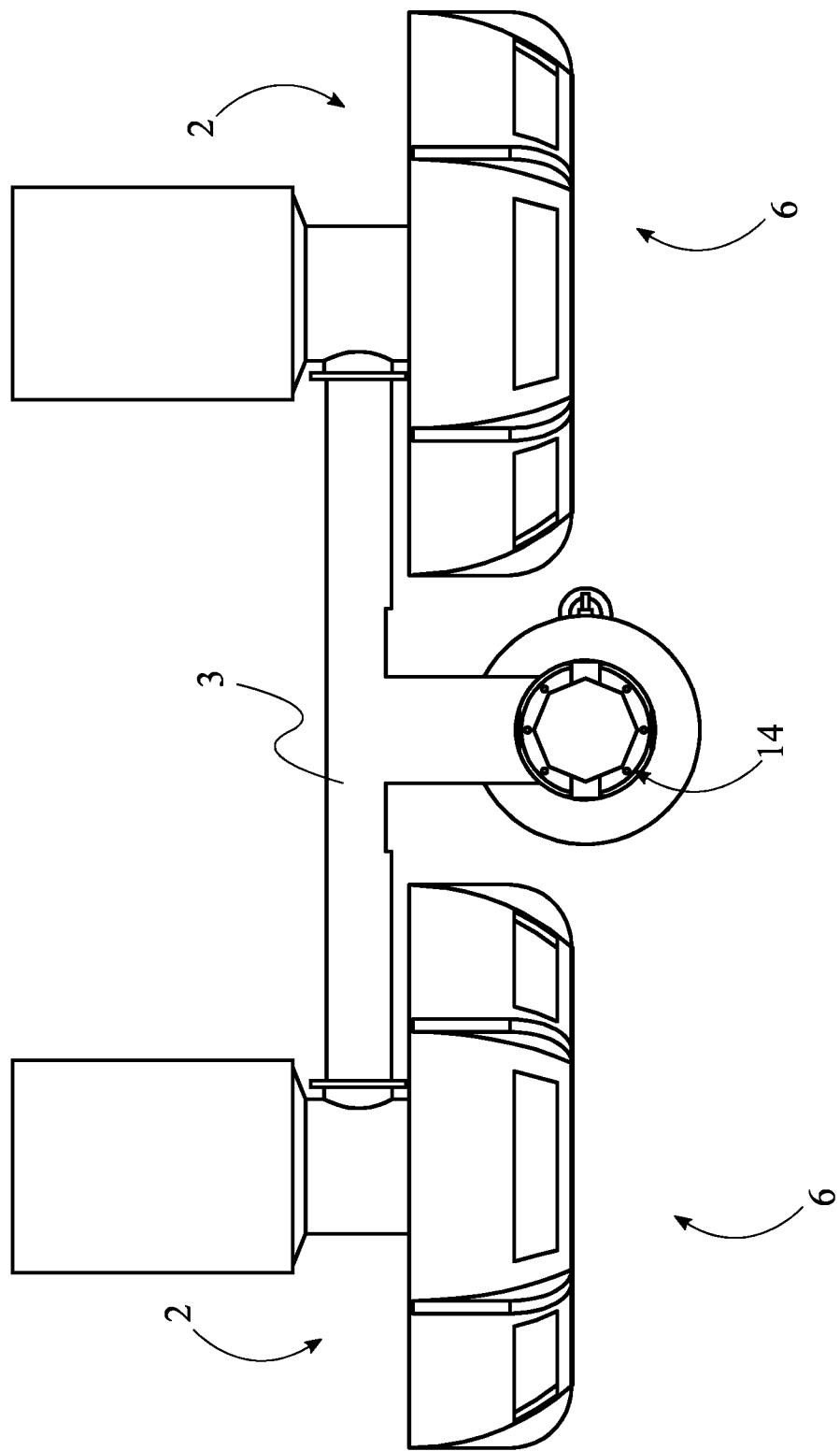
FIG. 8 is a top plan view of the present invention.

In order to help with the maintenance of the plurality of turbines, and for easy accessibility to a user, the present invention comprises a plurality of boat mounting holes 15. As seen in FIG. 2, through FIG. 5, the plurality of boat mounting holes 15 is distributed along the longitudinal axis 1a of the telescopic pillar 1. Preferably, the plurality of boat mounting holes 15 traverses into the telescopic pillar 1. This is so that, the user may hook the user's boat onto one of the plurality of mounting holes 15, after the telescopic pillar 1 raises the plurality of turbines out of the water. In other words, a small boat may be attached to the present invention with the help of the mounting holes 15, and the user may pressure wash the plurality of turbines 2 without any chemicals, thereby helping to keep the water body chemical free during system maintenance. Thus, when the hydrokinetic power generation device is generating current, or during a working mode of the present invention, the plurality of turbines is positioned inside of a water body 16. Alternately, during a cleaning mode, the plurality of turbines is lifted above the water body 16, with the help of the lifting mechanism 5.

It should be noted that any other electrical and electronic components that are known to one of ordinary skill in the art and are essential for the smooth functioning of hydrokinetic turbine device falls under the scope of the present invention. Examples of such components include, but are not limited to sensors, electric converters, wires, cables, microcontrollers, rechargeable back up batteries etc. They may be housed within the turbine connecting shaft 3, within the generator compartments adjacent to the plurality of turbines 2, within the telescopic pillar 1, within the lifting mechanism compartment etc. or any other location, as long as the objectives of the present invention are not altered.

Although the invention has been explained in relation to its preferred embodiment, it is to be understood that many other possible modifications and variations can be made without departing from the spirit and scope of the invention as hereinafter claimed.

What is claimed is:

1. A telescopic hydrokinetic turbine system, comprising:
a telescopic pillar;
a plurality of turbines;
a turbine connecting shaft;
a mounting base;
a plurality of diffusers;
a lifting mechanism;
an electrical system;
the turbine connecting shaft being mounted onto the telescopic pillar;
the plurality of turbines being mounted onto terminal ends of the turbine connecting shaft;
the turbine connecting shaft being slidable along a longitudinal axis of the telescopic pillar;
the turbine connecting shaft being mounted on to a first position on the telescopic pillar, wherein the first position is laterally offset from a first end of the telescopic pillar;
a second end of the telescopic pillar being mounted onto the mounting base, wherein the second end is positioned opposite to the first end across the telescopic pillar;
the plurality of diffusers being mounted laterally around each of the plurality of turbines;
a first diffuser of the plurality of diffusers extends axially in front of each of the plurality of turbines;
the lifting mechanism being operably coupled to the telescopic pillar, wherein operating the lifting system enables normal extension and retraction of the first end of telescopic pillar with respect to the second end; and
the plurality of turbines being electrically connected to the electrical system.

2. The telescopic hydrokinetic turbine system of claim 1, wherein extension and retraction of the telescopic pillar enables extension and retraction of the plurality of turbines and the turbine connecting shaft.

3. The telescopic hydrokinetic turbine system of claim 1, wherein the lifting mechanism is a hydraulic lift.

4. The telescopic hydrokinetic turbine system of claim 1, the electrical system comprising:
- an electric generator, a power distribution grid, and an electricity distribution network;
- the plurality of turbines being electrically connected to the electric generator; and
- the electric generator being connected to the power distribution grid through the electricity distribution network.

5. The telescopic hydrokinetic turbine system of claim 4, wherein the electricity distribution network comprises submarine cables.

6. The telescopic hydrokinetic turbine system of claim 1, further comprising:
- the plurality of diffusers further comprises a second diffuser;
- the first diffuser comprising an envelope ring and a plurality of gaps;
- the plurality of gaps traversing the envelope ring;
- the first diffuser being mounted around the each of the plurality of turbines;
- the first diffuser being positioned offset from each of the plurality of turbines;
- the first diffuser circumscribing each of the plurality of turbines; and
- the second diffuser being mounted onto the envelope ring.

7. The telescopic hydrokinetic turbine system of claim 6, comprising:
- the second diffuser comprising a plurality of fins; and
- the plurality of fins being evenly distributed around the envelope ring.

8. The telescopic hydrokinetic turbine system of claim 1, comprising:
- each of the plurality of turbines comprising a plurality of blades; and
- the plurality of blades being rotatable and counter rotatable around a central transversal axis.

9. The telescopic hydrokinetic turbine system of claim 1, comprising:
- an automatic piloting system; and
- the automatic piloting system being rotatably coupled to the telescopic pillar, wherein the automatic piloting system orients the plurality of turbines towards a direction of optimum tide and water current.

10. The telescopic hydrokinetic turbine system of claim 1, comprising:
- a plurality of boat mounting holes;
- the plurality of boat mounting holes being distributed along a length of the telescopic pillar; and
- the plurality of boat mounting holes traversing into the telescopic pillar.

11. The telescopic hydrokinetic turbine system of claim 1, wherein during a working mode, the plurality of turbines is mounted inside of a water body.

12. The telescopic hydrokinetic turbine system of claim 11, wherein during a cleaning mode, the plurality of turbines is lifted above the water body, with the help of the lifting mechanism.

13. A telescopic hydrokinetic turbine system, comprising:
- a telescopic pillar;
- a plurality of turbines;
- a turbine connecting shaft;
- a mounting base;
- a plurality of diffusers;
- a lifting mechanism;
- an electric generator;
- a power distribution grid;
- an electricity distribution network;
- the turbine connecting shaft being mounted onto the telescopic pillar;
- the plurality of turbines being mounted onto terminal ends of the turbine connecting shaft;
- the turbine connecting shaft being slidable along a longitudinal axis of the telescopic pillar;
- the turbine connecting shaft being mounted on to a first position on the telescopic pillar, wherein the first position is laterally offset from a first end of the telescopic pillar;
- a second end of the telescopic pillar being mounted onto the mounting base, wherein the second end is positioned opposite to the first end across the telescopic pillar;
- the plurality of diffusers being mounted laterally around each of the plurality of turbines;
- a first diffuser of the plurality of diffusers extends axially in front of each of the plurality of turbines;
- the lifting mechanism being operably coupled to the telescopic pillar, wherein operating the lifting system enables normal extension and retraction of the first end of telescopic pillar with respect to the second end;
- the plurality of turbines being electrically connected to the electric generator;
- the electric generator being connected to the power distribution grid through the electricity distribution network.

14. The telescopic hydrokinetic turbine system of claim 13, wherein extension and retraction of the telescopic pillar enables extension and retraction of the plurality of turbines and the turbine connecting shaft.

15. The telescopic hydrokinetic turbine system of claim 13, wherein the electricity distribution network comprises submarine cables.

16. The telescopic hydrokinetic turbine system of claim 13, further comprising:
- the plurality of diffusers further comprises a second diffuser;
- the first diffuser comprising an envelope ring and a plurality of gaps;
- the plurality of gaps traversing the envelope ring;
- the first diffuser being mounted around the each of the plurality of turbines;
- the first diffuser being positioned offset from each of the plurality of turbines;
- the first diffuser circumscribing each of the plurality of turbines; and
- the second diffuser being mounted onto the envelope ring.

17. The telescopic hydrokinetic turbine system of claim 16, comprising:
- the second diffuser comprising a plurality of fins; and
- the plurality of fins being evenly distributed around the envelope ring.

18. The telescopic hydrokinetic turbine system of claim 13, comprising:
- each of the plurality of turbines comprising a plurality of blades; and
- the plurality of blades being rotatable and counter rotatable around a central transversal axis.

19. The telescopic hydrokinetic turbine system of claim 13, comprising:
- an automatic piloting system; and
- the automatic piloting system being rotatably coupled to the telescopic pillar, wherein the automatic piloting system orients the plurality of turbines towards a direction of optimum tide and water current.

20. The telescopic hydrokinetic turbine system of claim 13, comprising:
  a plurality of boat mounting holes;
  the plurality of boat mounting holes being distributed along a length of the telescopic pillar; and
  the plurality of boat mounting holes traversing into the telescopic pillar.

* * * * *